UNITED STATES PATENT OFFICE.

MELVIN JINCKS, OF CONESUS CENTRE, ASSIGNOR OF ONE-HALF TO STEPHEN E. SHERWOOD, OF SOUTH LIVONIA, NEW YORK.

PROCESS OF BRAZING.

SPECIFICATION forming part of Letters Patent No. 259,274, dated June 6, 1882.

Application filed April 11, 1882. (No specimens.)

*To all whom it may concern:*

Be it known that I, MELVIN JINCKS, of Conesus Centre, in the county of Livingston and State of New York, have invented certain new and useful Improvements in Process of Brazing; and I do hereby declare that the following is a full, clear, and exact description thereof.

This invention relates to a new and improved method or process of brazing cast-iron to cast-iron or to steel or to brass, whereby the object can be accomplished successfully and with great facility, as will be fully understood from the following description.

To carry my invention into effect, I first heat the parts to be brazed to a red heat and apply to the surfaces a fine powder of prussiate of potash. I then reheat the parts until this powder melts and incorporates with the surfaces of the metal or metals. I next apply borax to the surfaces and again heat until this is melted. I now put on the parts a sufficient quantity of brass for the object required, and again heat until the brass fuses, which completes the process of brazing.

By this process I am able to braze cast-iron to steel as well as cast-iron to cast-iron, or the latter to brass.

Having described my invention, I claim—

The process of brazing cast-iron or steel with brass, the same consisting in first heating the parts to a red heat and applying prussiate of potash to the same; second, reheating until the prussiate of potash incorporates with the surfaces of the metal; third, applying borax to the surfaces; and, fourth, adding brass thereto and heating until the brass fuses, substantially as described.

In testimony that I claim the foregoing as my own I affix my signature in presence of two witnesses.

MELVIN JINCKS.

Witnesses:
J. B. THURSTON,
GEO. N. HALLOCK.